United States Patent
Stadler

(10) Patent No.: US 11,548,335 B2
(45) Date of Patent: Jan. 10, 2023

(54) PASSENGER COMPARTMENT FOR COUPLING TO AN AIRCRAFT OR TO A LAND VEHICLE

(71) Applicant: AUDI AG, Ingolstadt (DE)

(72) Inventor: Michael Stadler, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 689 days.

(21) Appl. No.: 16/488,674

(22) PCT Filed: Sep. 25, 2018

(86) PCT No.: PCT/EP2018/075884
§ 371 (c)(1),
(2) Date: Aug. 26, 2019

(87) PCT Pub. No.: WO2019/072537
PCT Pub. Date: Apr. 18, 2019

(65) Prior Publication Data
US 2019/0375259 A1    Dec. 12, 2019

(51) Int. Cl.
*B60F 5/02*     (2006.01)
*B60L 58/20*   (2019.01)
(Continued)

(52) U.S. Cl.
CPC .................. *B60F 5/02* (2013.01); *B60K 1/04* (2013.01); *B60K 11/06* (2013.01); *B60L 58/20* (2019.02);
(Continued)

(58) Field of Classification Search
CPC ....................................................... B60F 5/02
See application file for complete search history.

(56) References Cited

U.S. PATENT DOCUMENTS 2,619,301 A * 11/1952 Hall .......................... B60F 5/02
244/54
6,059,058 A *  5/2000 Dower ..................... B60L 50/52
180/65.265
(Continued)

FOREIGN PATENT DOCUMENTS

CN        2521074 Y    11/2002
CN     101961974 A     2/2011
(Continued)

OTHER PUBLICATIONS

International Preliminary Report on Patentability and Written Opinion of the International Searching Authority dated Apr. 14, 2020, in connection with corresponding international Application No. PCT/EP2018/075884 (8 pgs.).

(Continued)

*Primary Examiner* — Erez Gurari
(74) *Attorney, Agent, or Firm* — Maier & Maier, PLLC

(57) ABSTRACT

A passenger compartment which has a first connection device, by which the passenger compartment can be coupled to an aircraft, and a second connection device, by which the passenger compartment can be coupled to a land vehicle. The passenger compartment has an electrical circuit with an electrical energy storage. The electrical circuit of the passenger compartment has a coupling device by which electrical energy can be input from the electrical energy storage into an electrical circuit of the aircraft. The electrical circuit of the passenger compartment has a further coupling device by which electrical energy can be input from the electrical energy storage into an electrical circuit of the land vehicle.

13 Claims, 2 Drawing Sheets

(51) Int. Cl.
*B60K 1/04* (2019.01)
*B60K 11/06* (2006.01)
*B60K 1/00* (2006.01)
*B62D 63/02* (2006.01)

(52) U.S. Cl.
CPC .................. *B60K 2001/005* (2013.01); *B60K 2001/0438* (2013.01); *B62D 63/025* (2013.01); *B64C 2201/027* (2013.01)

(56) References Cited

U.S. PATENT DOCUMENTS

| | | | |
|---|---|---|---|
| 10,286,925 B2* | 5/2019 | Evans | B61B 13/00 |
| 2003/0038470 A1 | 2/2003 | Chernoff et al. | |
| 2005/0230524 A1* | 10/2005 | Ishiba | B60F 5/02 244/23 A |
| 2011/0079166 A1* | 4/2011 | Popa-Simil | B60L 50/60 180/2.2 |
| 2011/0163197 A1* | 7/2011 | Farrag | B64C 37/00 244/2 |
| 2013/0125778 A1* | 5/2013 | LaCabe | B61B 15/00 104/287 |
| 2015/0027795 A1 | 1/2015 | Hirai et al. | |
| 2016/0311282 A1* | 10/2016 | Nam | B64C 25/00 |
| 2017/0080953 A1* | 3/2017 | Zhao | B61B 10/02 |
| 2018/0126871 A1* | 5/2018 | Martinotti | B60L 13/10 |
| 2018/0237086 A1* | 8/2018 | Evans | B60F 5/02 |
| 2018/0320402 A1* | 11/2018 | Evans | B64C 39/024 |
| 2019/0375259 A1* | 12/2019 | Stadler | B60K 1/04 |
| 2020/0164978 A1* | 5/2020 | Perini | B64C 29/0016 |

FOREIGN PATENT DOCUMENTS

| | | |
|---|---|---|
| CN | 103917388 A | 7/2014 |
| DE | 20 2012 001 750 U1 | 3/2012 |
| DE | 10 2016 005 931 A1 | 2/2017 |
| DE | 10 2016 011 656 A1 | 3/2017 |
| DE | 10 2016 209 099 A1 | 7/2017 |

OTHER PUBLICATIONS

Examination Report dated Jun. 7, 2019 in corresponding German application No. 10 2017 218 061.7; 12 pages.
International Search Report and Written Opinion of the International Searching Authority dated Nov. 14, 2018 in corresponding International application No. PCT/EP2018/075884; 36 pages.
Office Action dated Aug. 25, 2022, in corresponding Chinese Application No. 201880025651.2, 15 pages including English-language translation.

* cited by examiner

PASSENGER COMPARTMENT FOR COUPLING TO AN AIRCRAFT OR TO A LAND VEHICLE

FIELD

The disclosure relates to a passenger compartment which has a first connection device, by means of which the passenger compartment can be coupled to an aircraft. The passenger compartment has a second connection device, by means of which the passenger compartment can be coupled to a land vehicle. The passenger compartment has an electrical circuit with an electrical energy storage. The electrical circuit of the passenger compartment has a coupling device by means of which electrical energy can be input from the electrical energy storage into an electrical circuit of the aircraft.

BACKGROUND

Mobility in particular in cities is at a crossroads. In the metropolises of this world, new mobility concepts are therefore being sought. In particular in very large cities or megacities, there are sufficient possibilities of public transport, for example, in the form of subways, tramways and the like, which to some extent represent an effective way of travelling. On the other hand, there is a need for individual transport which is in many times desirable due to the increased convenience. However, individual transport is made exceedingly difficult due to the enormously high number of vehicles and the resulting traffic congestion.

In order to provide a remedy for this, concepts have been envisaged in which an occupant of a passenger compartment or of a chassis can travel either through the air or on the ground by means of a drivable sub-frame. In the latter case, the passenger compartment is coupled to the drivable sub-frame, resulting in the formation of a passenger car consisting of the passenger compartment and the drivable sub-frame. However, the chassis or the passenger compartment together with the occupant can also be uncoupled from the drivable sub-frame and docked to an aircraft, for example, in the form of a helicopter, in particular a quadrocopter.

This results in new degrees of freedom of locomotion and thus of individual transport. However, it must be ensured that the availability is sufficiently high for such concepts so that, in the case of failure of the locomotion of the sub-frame, no breakdown occurs and, in the case of failure of the locomotion of the helicopter, no crash occurs.

When the chassis or the passenger compartment which can be coupled to the quadrocopter has no battery that can assist the battery of the quadrocopter, the battery of the quadrocopter must be designed so that it can move the quadrocopter coupled to the passenger compartment over a desired route or maximum distance. Accordingly, the battery has to be designed to be relatively large and heavy. But the quadrocopter must then transport the entire weight of the battery even in the state in which it is not loaded with the passenger compartment. Based on the energy density of current batteries, it must therefore be assumed that the battery contributes considerably to the empty weight of the quadrocopter. Empty flights of the quadrocopter thus entail considerable energy expenditure and it would be desirable for the quadrocopter to be able to use a smaller and lighter battery.

In this connection, DE 10 2016 011 656 A1 describes a transport capsule for exchangeable connection to a drone or to a land vehicle. The transport capsule has a battery which assists in the transport work of the drone. Here, the battery of the transport capsule and a battery of the drone are used for driving rotor blades of the drone. The land vehicle also has a storable energy source for the execution of a driving function.

SUMMARY

The aim of the present invention is to provide a passenger compartment of the type mentioned at the start, which is improved with regard to its possibilities of application.

The passenger compartment according to the invention has a first connection device, by means of which the passenger compartment can be coupled to an aircraft. The passenger compartment has a second connection device, by means of which the passenger compartment can be coupled to a land vehicle. The passenger compartment has an electrical circuit with an electrical energy storage. The electrical circuit of the passenger compartment has a coupling device by means of which electrical energy can be input from the electrical energy storage into an electrical circuit of the aircraft. The electrical circuit of the passenger compartment has a further coupling device by means of which electrical energy can be input from the electrical energy storage into an electrical circuit of the land vehicle.

In this manner, when the passenger compartment is coupled to the land vehicle, the electrical energy storage of the passenger compartment can increase the range and/or the power of a means of transport or of a vehicle which comprises the land vehicle as drivable base frame and the passenger compartment which is coupled to the land vehicle. On the other hand, if the passenger compartment is coupled to an aircraft, then the electrical energy storage of the passenger compartment can provide electrical energy for driving the aircraft. As a result, an electrical energy storage of the aircraft does not have to be designed to be as large and as heavy as would be the case without the provision of the electrical energy storage of the passenger compartment. Thus, a reduction of the weight of the aircraft can be achieved.

In addition, a reduction of the weight of the passenger compartment can be achieved. When the passenger compartment is coupled to the land vehicle, the electrical energy storage of the passenger compartment and an electrical energy storage of the land vehicle can be used for moving the land vehicle, that is to say that they can supply a corresponding electrical drive device of the land vehicle with electrical energy. Consequently, the passenger compartment is improved with regard to its possibilities of application. The passenger compartment can then optionally assist an electrical drive unit of the aircraft or an electrical drive unit of the land vehicle, depending on whether the passenger compartment is coupled to the aircraft or to the land vehicle.

When the passenger compartment is coupled both to the aircraft and also to the land vehicle, then the electrical energy storage of the passenger compartment can supply the drive unit of the aircraft with electrical energy when the aircraft is transporting the passenger compartment with land vehicle coupled to the passenger compartment. Moreover, the electrical energy storage of the passenger compartment can supply the electrical drive unit of the land vehicle with electrical energy when the drive unit of the land vehicle is to ensure the transport of the passenger compartment coupled to the aircraft. In a state in which the passenger compartment is coupled both to the aircraft and also to the land vehicle, the respective drive units of the aircraft and of the land vehicle, respectively, can also preferably be supplied with electrical energy by all three energy storages, that is to say by the electrical energy storage of the passenger compartment, the electrical energy storage of the aircraft, and the electrical energy storage of the land vehicle.

Such a state in which the passenger compartment is coupled both to the aircraft and also to the land vehicle can then occur, for example, when the drivable sub-frame in the form of the land vehicle is to be transported to a site where not enough land vehicles are present at a given time. Or the aircraft can be taken to a site from which the passenger would like to continue travelling using the aircraft instead of the land vehicle.

The electrical energy storage of the passenger compartment can be designed, in particular, as a high-voltage battery, that is to say a battery which provides a nominal voltage of more than 60 volts. In particular, such a high-voltage battery can provide a nominal voltage of approximately 300 volts to approximately 600 volts. Thus the aircraft or the land vehicle can be assisted particularly well with regard to the transport, depending on the need.

Preferably, the electrical energy storage of the passenger compartment has sufficient capacity to supply an electrical drive unit of the aircraft for a flight of the aircraft coupled to the passenger compartment to a landing site. In other words, the electrical energy storage of the passenger compartment alone is capable of providing sufficient electrical power to supply the electrical drive unit of the aircraft. Thus, in the case of a failure of an electrical energy storage of the aircraft, it can be ensured that the aircraft with the passenger compartment coupled to the aircraft can land safely. However, if both the electrical energy storage of the aircraft and also the electrical energy storage of the passenger compartment are available, then a correspondingly greater distance can be covered by the aircraft to which the passenger compartment is coupled.

This embodiment takes into account the circumstance that a switching off of the electrical energy storage can occur due to an error of the electrical energy storage. Such an error can be a malfunction of hardware or software of the battery, a short circuit of a battery cell of the battery, a failure of the battery controller, a short circuit due to the presence of condensate in the electrical energy storage or due to leaks of the electrical energy storage which have led to penetration of an electrically conductive medium into the electrical energy storage. If, due to such an error, the battery or the electrical energy storage of the aircraft is switched off, then the electrical energy storage of the passenger compartment can nevertheless ensure a sufficient supply of the electrical drive unit of the aircraft to cover a certain distance. This results in an increased reliability with regard to the failure of the energy supply.

Preferably, the electrical energy storage of the passenger compartment moreover has sufficient capacity to supply an electrical drive unit of the land vehicle. In that case, an increased reliability with regard to a failure of the energy supply is achieved, when the passenger compartment is coupled to the land vehicle.

The aircraft can be designed in particular as an unmanned aircraft, also referred to as drone. Such a drone can in particular enable a self-sufficient flight operation and a corresponding navigation. Here, in particular a control device of the aircraft can ensure the self-sufficient flight operation and the independent navigation. An unmanned vehicle which has four rotors or propellers arranged in a plane and acting vertically downward is also referred to as a quadrocopter or a flying platform. Moreover, for the coupling to the passenger compartment, unmanned aircraft or flying machines with a different number of rotors or propellers can be used. Such an unmanned aircraft is preferably provided for the coupling to the passenger compartment, in particular with regard to the compactness and the lower complexity compared to a manned aircraft.

The passenger compartment can be coupled to the aircraft, wherein, in the electrical circuit of the aircraft, an electrical energy storage is arranged. Preferably, the electrical energy storage of the aircraft has sufficient capacity to supply an electrical drive unit of the aircraft for a flight of the aircraft coupled to the passenger compartment to a landing site. In that case, even in the case of a failure or switching off of the electrical energy storage of the passenger compartment, at least reaching the landing site is ensured by the electrical energy storage of the aircraft. The electrical energy storage of the aircraft as well can be designed in particular as a high-voltage battery.

For coupling the electrical circuits of the passenger compartment and of the aircraft or of the passenger compartment and the land vehicle, coupling devices designed in the manner of plugs can be provided. In this way, the coupling of the circuits can be implemented particularly easily.

However, it can also be provided that the coupling device and/or the further coupling device is/are designed for the wireless transmission of the electrical energy. In particular, the electrical energy can be transmitted by inductive coupling. By such a design, it is prevented in particular, that the coupling devices are affected in terms of their proper operation due to soiling or wear of plugs. Accordingly, the proper operation of the coupling devices can thus be maintained over the long term.

It has also been shown to be advantageous if the coupling device and/or the further coupling device comprise(s) at least one converter. For example, a direct current converter (DC-DC converter) can ensure that no undesired high voltage differences can occur between the electrical energy storage of the passenger compartment, on the one hand, and, on the other hand, an electrical energy storage of the aircraft or an electrical energy storage of the land vehicle, on the other hand. Moreover, charge differences can thus be compensated particularly easily. Thus, adverse effects on the electrical energy storages or the circuits can be prevented.

In the coupled state, the electrical energy storage of the passenger compartment and of the aircraft or of the land vehicle are preferably electrically connected in parallel.

It can be provided that the passenger compartment is coupled to the land vehicle. Here, between the passenger compartment and the land vehicle, a cooling channel is formed, through which air can flow for cooling the electrical energy storage of the passenger compartment. This is based on the finding that the cooling of electrical energy storages in electrically operated vehicles is of particular importance. Indeed, the capacity but also the useful life of the electrical energy storage is determined to a crucial extent by the temperature existing in the electrical energy storage.

In electric vehicles, elaborate fluid cooling systems are commonly used. Moreover, in an electric vehicle, multiple cooling circuits can be provided in order to ensure, on the one hand, an air conditioning of a passenger space of the electric vehicle and, on the other hand, the cooling of the electrical energy storage or of the battery of the electric vehicle. If, in an arrangement which comprises the passenger compartment coupled to the aircraft or to the land vehicle, respective separate cooling circuits of a fluid cooling system are provided for the respective energy storages, then this would considerably increase the effort and the complexity. Because it would then be necessary to provide closed cooling circuits in the respective components, that is to say in the passenger compartment, the aircraft and the land vehicle. Alternatively, elaborate interfaces would have to be provided, including possible active systems for the ventilation of cooling circuits through which a cooling fluid flows. Here, it is a particular challenge to ensure sufficient sealing at the interfaces. Such an effort cost can be prevented in the present case if, when the passenger compartment is coupled to the land vehicle, the cooling channel is formed between the passenger compartment and the land vehicle. In particular, the headwind can be used for cooling the electrical energy storage of the passenger compartment, when the land vehicle coupled to the passenger compartment is moving. Thus, preferably, air can flow in the driving direction of the land vehicle through the cooling channel.

The cooling channel can be provided with multiple cooling ribs in order to achieve an improved cooling capacity. Indeed, by providing such cooling ribs, the effective cooling surface is increased. In addition, such cooling ribs can support the passenger compartment when the passenger compartment is coupled to the land vehicle.

By providing such an air cooling of the electrical energy storage of the passenger compartment, elaborate cooling devices of the passenger compartment can be dispensed with, such as, for example, a coolant pump or a compressor for compressing a refrigerant, lines and/or hoses, coolers and/or evaporators and the like. Moreover, no elaborate interfaces for coupling a cooling circuit of the passenger compartment, through which a cooling fluid flows, to such a cooling circuit of the land vehicle have to be provided. The effort required for cooling the electrical energy storage of the passenger compartment is thus particularly low. Moreover, particularly low costs result for cooling the electrical energy storage of the passenger compartment.

Preferably, the cooling channel is delimited by a bottom of the passenger compartment. Here, the electrical energy storage of the passenger compartment can adjoin the bottom of the passenger compartment. Additionally or alternatively, the bottom of the passenger compartment can be provided at least in sections by a housing of the electrical energy storage of the passenger compartment. Thus, a very direct cooling of the electrical energy storage of the passenger compartment can be achieved by the cooling air that is flowing past.

This also applies if the passenger compartment is coupled to the aircraft. Indeed, during the flight of the aircraft, the headwind can then particularly satisfactorily ensure a cooling of the electrical energy storage of the passenger compartment.

Preferably, in the electrical circuit of the land vehicle, an electrical energy storage is arranged, which adjoins the cooling channel. Thus, by means of the cooling air flowing through the cooling channel, the electrical energy storage of the land vehicle can also be cooled particularly simply and with little effort. The electrical energy storage of the land vehicle is also preferably designed as a high-voltage battery.

The land vehicle can have a cooling circuit through which a cooling fluid can flow for cooling the electrical energy storage of the land vehicle. The cooling capacity of this cooling circuit can then be assisted in that the air flowing through the cooling channel ensures additional cooling of the electrical energy storage of the land vehicle.

Preferably, a control device is provided, which is designed to distribute electrical power provided and/or received by the electrical energy storages of the land vehicle and of the passenger compartment to the energy storages, depending on a temperature of the respective energy storage. Thus, the power configuration of the two electrical energy storages can be adapted so that the main power can be taken from or introduced into the better-cooled energy storage. Accordingly, the power input or the power output of the less well cooled battery can be decreased, so that this battery or this energy storage is not thermally stressed by the heating occurring during increased power input or power output.

The control device can in particular control converters such as DC-DC converters, for example, in order to ensure the power distribution of the energy storages or the power allocation over the energy storages.

In particular, the control device can distribute the provided and/or received electrical power depending on the cooling capacity brought about by the air flowing through the cooling channel. Thus, it can be ensured in a simple manner that the electrical energy storages are operated in temperature ranges suitable for the respective power input or power output.

BRIEF DESCRIPTION OF THE DRAWINGS

The invention also includes combinations of the described embodiments. Below, an embodiment example of the invention is described. For this purpose, the figures show:

DETAILED DESCRIPTION

Figure 1:
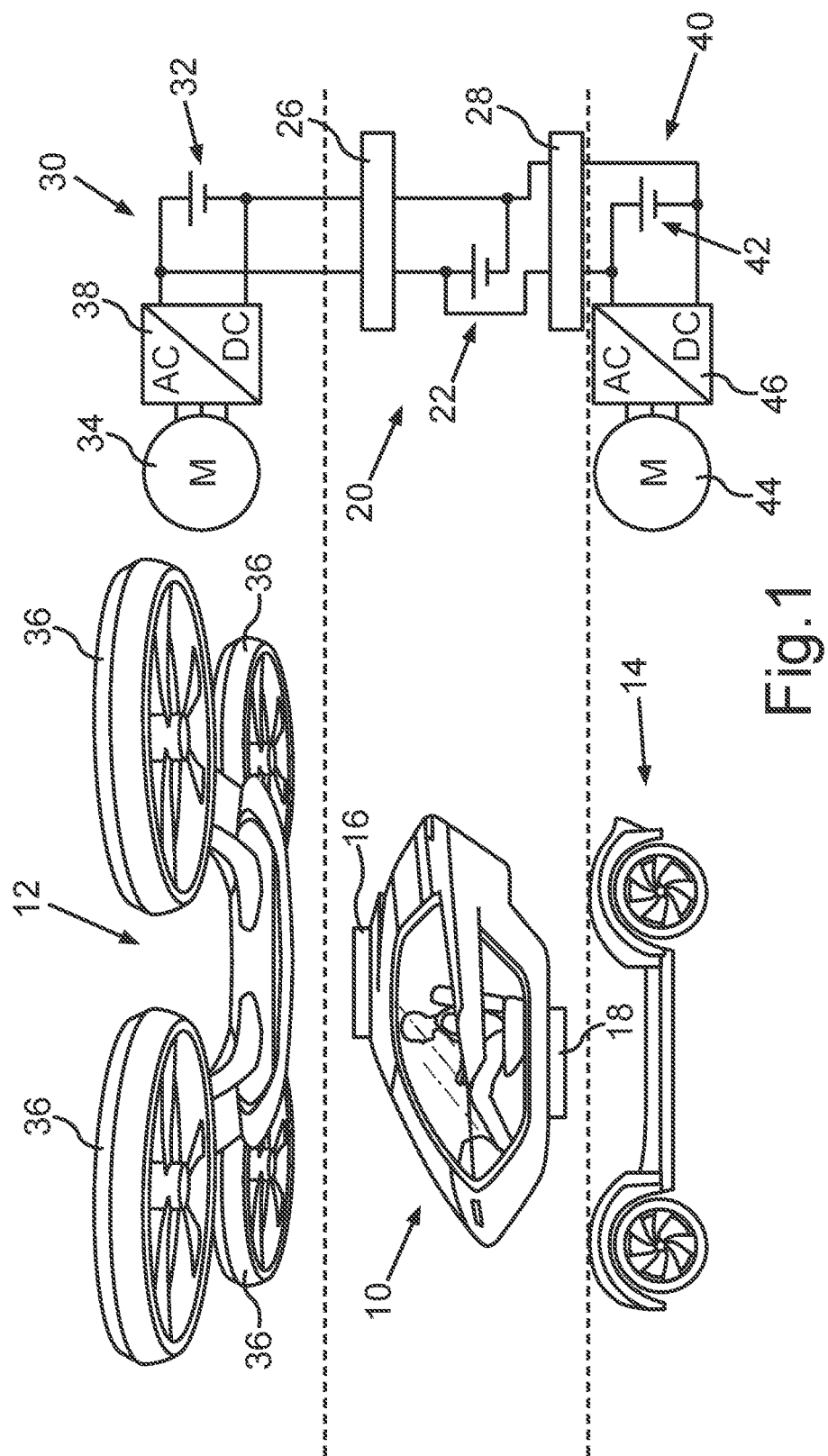
Figure 2:
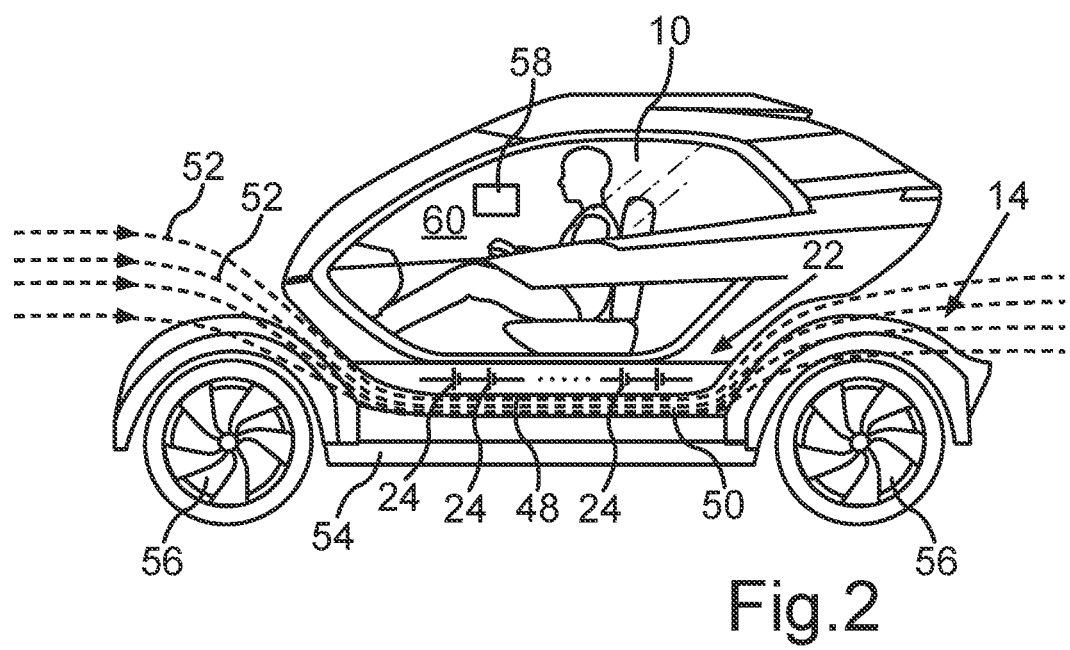
Figure 3:
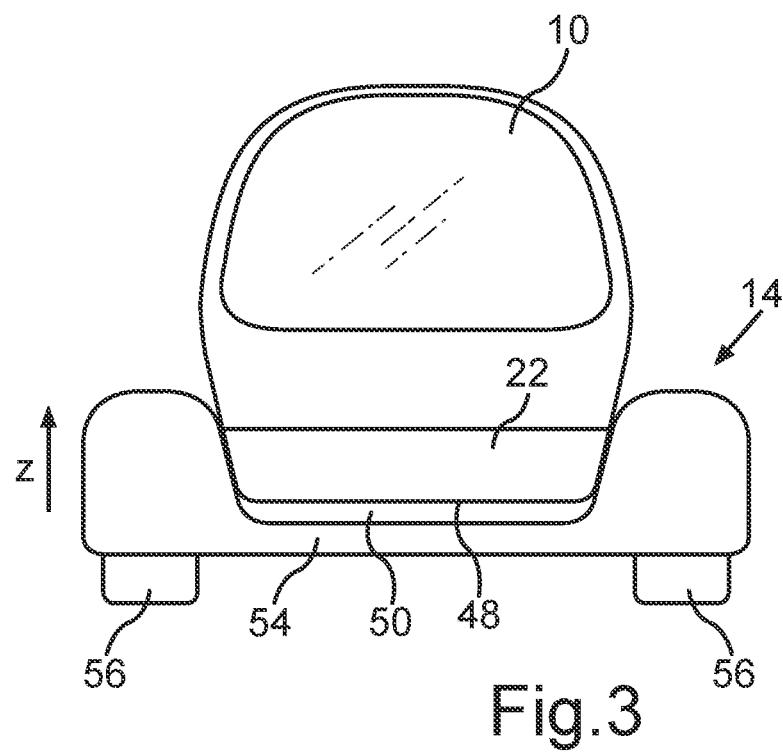

FIG. 1 diagrammatically, a passenger compartment which can be coupled optionally to a land vehicle in the form of a drivable sub-frame or to an aircraft designed in the present case as a quadrocopter, wherein, in addition, respective electrical circuits of the land vehicle, of the passenger compartment and of the quadrocopter are illustrated;

FIG. 2 in a diagrammatic side view, the passenger compartment coupled to the land vehicle, wherein, between the passenger compartment and the land vehicle, a cooling channel through which a headwind flows is formed; and FIG. 3 diagrammatically, the passenger compartment coupled to the land vehicle in a front view.

The embodiment example explained below is a preferred embodiment of the invention. In the embodiment examples, the described components of the embodiment in each case represent individual features of the invention, which are to be considered independently of one another, and which develop the invention in each case also independently of one another and therefore should be considered, individually or in a combination other than the combination shown, as part of the invention. Moreover, the described invention can also be completed by additional described features of the invention.

In the figures, functionally equivalent elements are provided in each case with the same reference numerals.

A passenger compartment 10 shown diagrammatically in FIG. 1 can optionally be coupled to an aircraft which is represented as quadrocopter 12 in the embodiment example shown. However, the passenger compartment 10 can also be coupled to a drivable sub-frame or to a land vehicle 14. A passenger or several passengers located in the passenger compartment 10 can thus optionally move overland or by air, depending on whether the passenger compartment 10 is coupled to the quadrocopter 12 or to the land vehicle 14.

In the present case, the passenger compartment 10 has a first connection device 16 by means of which the passenger compartment 10 can be coupled to the quadrocopter 12. By means of a second connection device 18 of the passenger compartment 10, the passenger compartment 10 can be coupled to the land vehicle 14. When the quadrocopter 12 is docked to the connection device 16 of the passenger compartment 10 and the passenger compartment 10 is at the same time also coupled to the land vehicle 14, the passenger compartment 10 can also be coupled both to the land vehicle 14 and also to the quadrocopter 12.

In FIG. 1, moreover, an electrical circuit 20 of the passenger compartment 10 is shown. The electrical circuit 20 comprises an electrical energy storage in the form of a high-voltage battery 22, represented highly diagrammatically in FIG. 1. In fact, the high-voltage battery 22 of the passenger compartment 10 comprises multiple battery cells 24 which are also represented diagrammatically in FIG. 2. The electrical circuit 20 of the passenger compartment 10 comprises a first coupling device 26 which can be integrated in particular in the connection device 16. Moreover, the electrical circuit 20 of the passenger compartment 10 comprises a further or second coupling device 28 which can be integrated in particular in the second connection device 18.

The quadrocopter 12 also comprises an electrical circuit 30 with an electrical energy storage which is designed as high-voltage battery 32. By coupling the electrical circuit 20 of the passenger compartment 10 to the electrical circuit 30 of the quadrocopter 12, electrical energy from the high-voltage battery 22 can be made available to an electrical drive unit 34 of the quadrocopter 12. In the present case, only one such electrical drive unit 34 is shown diagrammatically; however, such electrical drive units 34, for example, in the form of a respective electric motor, can be provided in each case for a respective rotor 36 of the quadrocopter 12. When the circuit 20 of the passenger compartment 10 is not coupled to the circuit 30 of the quadrocopter 12, the (for example, four) drive units 34 are then supplied with electrical energy by the high-voltage battery 32 of the quadrocopter.

However, by coupling the circuits 20, 30 to one another by means of the first coupling device 26, both the high-voltage battery 22 of the passenger compartment 10 and also the high-voltage battery 32 of the quadrocopter 12 can be used for supplying the electrical drive unit 34. An alternate current rectifier 38 can ensure the conversion of the direct current made available by the high-voltage batteries 22, 32 into alternating current for the electrical drive unit 34. Preferably, both the high-voltage battery 22 and also the high-voltage battery 32 have a capacity such that the quadrocopter 12 loaded with the passenger compartment 10 (in which at least one passenger is located) can then fly at least some distance or land safely when the high-voltage battery 22 of the passenger compartment 10 or the high-voltage battery 32 of the quadrocopter 12 fails or is switched off. Corresponding switch-off devices which ensure, for example, in the case of a error, that the respective high-voltage battery 22, 32 is switched off, are not represented in FIG. 1 for the sake of simplicity.

Analogously, via the additional or second coupling device 28, the circuit 20 of the passenger compartment 10 can be coupled to a circuit 40 of the drivable sub-frame or of the land vehicle 14. The electrical circuit 40 of the land vehicle 14 also has an electrical energy storage in the form of a high-voltage battery 42 and at least one electrical drive unit 44 for the movement of the land vehicle 14. The electrical drive unit 44 can drive or move the land vehicle 14 without the passenger compartment 10 being coupled to the land vehicle 14 and also when the passenger compartment 10 is coupled to the land vehicle 14. An alternate current converter 46 is also provided in the circuit 40 of the land vehicle 14.

When the passenger compartment 10 is coupled to the land vehicle 14, it is preferably provided that the respective high-voltage battery 22, 42 alone has sufficient capacity to provide sufficient electrical power in order to move the land vehicle 14 coupled to the passenger compartment 10, even when the land vehicle is coupled to the passenger compartment 10 (occupied by at least one passenger). This results in an increased reliability with regard to a error of the energy supply with regard to the two high-voltage batteries 22, 42, when the passenger compartment 10 is coupled to the land vehicle 14.

The coupling devices 26, 28 can be implemented by plug systems or by wireless energy transmission technologies. Moreover, the coupling devices 26, 28 preferably have DC-DC converters in order to compensate for different electrical charges of the high-voltage batteries 22, 32, 42 or different voltages of the high-voltage battery 22, 32, 42.

In the case of the purely electrically operated quadrocopter 12 or the purely electrically operated land vehicle 14 as well as in the case of the electrical circuit 20 of the passenger compartment 10, the cooling of the high-voltage batteries 22, 32, 42 is of great importance with regard to their useful life and their capacity.

In FIG. 2, the passenger compartment 10 is diagrammatically shown coupled to the land vehicle 14. In this state of the passenger compartment 10 coupled to the land vehicle 14, a cooling channel 50 is formed between the bottom 48 of the passenger compartment 10 and the land vehicle 14, through which air can flow for cooling the high-voltage battery 22. The high-voltage battery 22 of the passenger compartment 10 adjoins this bottom 48. The air, in the form of a headwind, is represented diagrammatically by flow arrows 52 in FIG. 2.

The cooling channel 50 formed between the bottom 48 of the passenger compartment 10 and an undercarriage 54 of the land vehicle 14 can be seen clearly in FIG. 3. Accordingly, the cooling channel 50 is delimited, on the one hand, by the bottom 48 of the passenger compartment 10 and, on the other hand, by the undercarriage 54 of the land vehicle 14 in the vertical direction. The vertical direction or the vehicle vertical direction z is illustrated by an arrow in FIG. 3.

In the present case, the undercarriage 54 has a plate-shaped area arranged between wheels 56 of the land vehicle 14, through which air or the headwind flows when the passenger compartment 10 is coupled to the land vehicle 14. In this plate-shaped or flat area, the circuit 40 of the land vehicle 14 with the high-voltage battery 42 is preferably also accommodated. Thus, during the drive, the high-voltage battery 42 is also cooled by the headwind.

The passenger compartment 10 and/or the land vehicle 14 can have a control device 58 or a control unit which controls or regulates the power distribution between the high-voltage batteries 22, 42. Here, the control device 58 can adapt the power configuration of the high-voltage batteries 22, 42 so that more power is removed from the better-cooled high-voltage battery 22, 42 or, respectively, introduced during the charging of the high-voltage batteries 22, 42 into the respective high-voltage battery 22, 42. The less well-cooled high-voltage battery 22, 42 is accordingly less stressed. The control device 58 can implement such a power distribution in particular by a regulation or current control of DC-DC converters which are preferably part of the coupling devices 26, 28.

In the cooling channel 50, cooling ribs can ensure an increase in the effective cooling surface and thus provide a better cooling capacity for the high-voltage batteries 22, 42.

Due to the air cooling of the high-voltage battery 22, a cooling circuit in the passenger compartment 10 through which a cooling fluid flows can be dispensed with. However, for cooling an interior 60 of the passenger compartment 10, an air conditioning device with an evaporator can be provided. Moreover, the land vehicle 14 can have a cooling circuit through which a cooling fluid flows during operation, for cooling the high-voltage battery 42 of the land vehicle 14. Here too, in addition or alternatively, a refrigerant circuit with an evaporator can be provided.

The invention claimed is:

1. A passenger compartment comprising:
   a first connection device, by which the passenger compartment is coupleable to an aircraft,
   a second connection device, by which the passenger compartment is coupleable to a land vehicle, and
   an electrical circuit with an electrical energy storage,
   wherein the electrical circuit of the passenger compartment has a first coupling device by which electrical energy is transferrable from the electrical energy storage into an electrical circuit of the aircraft,
   wherein the electrical circuit of the passenger compartment has a second coupling device by which electrical energy is transferrable from the electrical energy storage into an electrical circuit of the land vehicle,
   wherein, when the passenger compartment is coupled to the land vehicle, a cooling channel is formed between the land vehicle and the passenger compartment through which air flows to cool the electrical energy storage of the passenger compartment,
   wherein the cooling channel is provided with a plurality of cooling ribs,
   wherein the electrical circuit of the land vehicle comprises an electrical energy storage which adjoins the cooling channel, and
   wherein the passenger compartment further comprises a control device which is configured to distribute electrical power between the electrical energy storages of the land vehicle and of the passenger compartment based on (1) a temperature of the energy storages and (2) a current cooling capacity of the cooling channel.

2. The passenger compartment according to claim 1, wherein the electrical energy storage of the passenger compartment has sufficient capacity to supply an electrical drive unit of the aircraft for a flight of the aircraft coupled to the passenger compartment to a landing site.

3. The passenger compartment according to claim 1, wherein the electrical circuit of the aircraft comprises an electrical energy storage which has sufficient capacity to supply an electrical drive unit of the aircraft for a flight of the aircraft coupled to the passenger compartment to a landing site.

4. The passenger compartment according to claim 1, wherein at least one of the first and second coupling devices is configured for wireless transmission of the electrical energy.

5. The passenger compartment according to claim 1, wherein at least one of the first and second coupling devices comprises at least one converter.

6. The passenger compartment according to claim 1, wherein the cooling channel is delimited by a bottom of the passenger compartment, and
   wherein the electrical energy storage of the passenger compartment adjoins the bottom of the passenger compartment and/or the bottom of the passenger compartment is provided at least in sections by a housing of the electrical energy storage of the passenger compartment.

7. The passenger compartment according to claim 1, wherein the land vehicle comprises a cooling circuit through which a cooling fluid flows for cooling the electrical energy storage of the land vehicle.

8. The passenger compartment according to claim 2, wherein the electrical circuit of the aircraft comprises an electrical energy storage which has sufficient capacity to supply an electrical drive unit of the aircraft for a flight of the aircraft coupled to the passenger compartment to a landing site.

9. The passenger compartment according to claim 2, wherein at least one of the first and second coupling devices is configured for wireless transmission of the electrical energy.

10. The passenger compartment according to claim 2, wherein at least one of the first and second coupling devices comprises at least one converter.

11. The passenger compartment according to claim 3, wherein at least one of the first and second coupling devices is configured for wireless transmission of the electrical energy.

12. The passenger compartment according to claim 3, wherein at least one of the first and second coupling devices comprises at least one converter.

13. The passenger compartment according to claim 4, wherein at least one of the first and second coupling devices comprises at least one converter.

* * * * *